United States Patent
Miyamoto

(10) Patent No.: US 7,800,487 B2
(45) Date of Patent: Sep. 21, 2010

(54) METHOD, APPARATUS AND PROGRAM FOR ALARMING DECREASE IN TIRE-PRESSURE

(75) Inventor: Kazuyoshi Miyamoto, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 581 days.

(21) Appl. No.: 11/819,622

(22) Filed: Jun. 28, 2007

(65) Prior Publication Data
US 2008/0018446 A1   Jan. 24, 2008

(30) Foreign Application Priority Data
Jul. 20, 2006   (JP) .............................. 2006-197725

(51) Int. Cl.
*B60C 23/02* (2006.01)
(52) U.S. Cl. ........................................ 340/442; 73/146
(58) Field of Classification Search ................. 340/442, 340/443, 444; 73/146, 146.2, 146.4, 146.5, 73/146.8
See application file for complete search history.

(56) References Cited

U.S. PATENT DOCUMENTS

2002/0011929 A1 * 1/2002 Sugisawa .................... 340/444

2005/0033486 A1 * 2/2005 Schmitt et al. ................. 701/1

FOREIGN PATENT DOCUMENTS

| JP | 2002-12013 A | 1/2002 |
|---|---|---|
| JP | 2005-134378 A | 5/2005 |

* cited by examiner

Primary Examiner—Toan N Pham
Assistant Examiner—Kerri McNally
(74) Attorney, Agent, or Firm—Birch, Stewart, Kolasch & Birch, LLP

(57) ABSTRACT

It is the purpose of the present invention to provide a method, apparatus and program for alarming decrease in tire air-pressure capable of precisely detecting decrease in tire air-pressure even during turning round a corner with a large bank angle.

The present invention discloses a method for alarming decrease in tire air-pressure that detects decrease in tire air-pressure using a judgment value obtained based on rotational wheel speeds obtained from tires loaded on a vehicle, comprising a step of detecting the rotational wheel speeds of respective tires when a vehicle turns round a corner, a step of calculating a vehicle speed from the rotational wheel speeds of respective tires, a step of detecting the yaw rate of the vehicle, a step of detecting acceleration to a lateral direction by a lateral directional acceleration sensor, a step of estimating a bank angle at a corner during turning using the yaw rate, vehicle speed and lateral directional acceleration of the vehicle, a step of calculating a judgment value from the rotational wheel speeds of respective tires and a step of preventing erroneous judgment occurring during turning round a corner with a bank angle based on the estimated bank angle.

3 Claims, 6 Drawing Sheets

METHOD, APPARATUS AND PROGRAM FOR ALARMING DECREASE IN TIRE-PRESSURE

BACKGROUND OF THE INVENTION

The present invention relates to a method, apparatus and program for alarming decrease in tire air-pressure.

It is utilized in a deflation warning system, DWS that a dynamic load radius is lessened for decreased tires and rotational wheel speed of tires with decreased pressure is faster than that of tires with normal inner pressure.

In the DWS, a deflation judgment value, DEL is calculated from the rotational wheel speeds of 4 wheel tires, for example, by the following equation (1);

$$DEL=\{(V1+V4)/2-(V2+V3)/2\}\div\{(V1+V2+V3+V4)/4\}\times100(\%) \quad (1)$$

(In the equation (1), V1 to V4 show the rotational wheel speeds V1 of a front left tire, V2 of a front right tire, V3 of a rear left tire and V4 of a rear right tire, respectively.). It is judged whether the tire air-pressure is decreased or not, and when it is judged that the air-pressure of even one wheel is decreased, an alarm is generated.

Hereat, when all of 4 wheel tires are normal inner pressure at straight running, all of V1 to V4 are the same value; therefore DEL calculated by the equation (1) is zero. On the other hand, when a car turns round a corner, centrifugal force is applied, load is not equally applied to all of 4 wheel tires even if all of 4 wheel tires are normal inner pressure and the dynamic load radii of 4 wheel tires come to differ. Accordingly, V1 to V4 are not wholly the same value in the equation (1), and the deflation judgment value DEL is not "0" that is a value at normal inner pressure at straight running and approaches to a threshold A for judging decrease in tire air-pressure in like manner as a case that tire air-pressure is decreased. What is even worse, it exceeds occasionally the threshold A for judging decrease in tire air-pressure. Consequently, detection precision is improved by correcting the deflation judgment value (DEL) (refer to Japanese Unexamined Patent Publication No. 2002-12013) during turning round a corner.

However, the correction is a correction appropriately used when a car turns round a corner without a bank angle. Further, when a car turns round a corner with a bank angle, the load distribution of each of 4 wheels is different from the load distribution at a case that a car turns round a corner without a bank angle; therefore the rotational wheel speed of each of 4 wheels in case that a car turns round a corner with a bank angle is different from the rotational wheel speed of each of 4 wheels in case that a car turns round a corner without a bank angle. Accordingly, if correction similar as correction carried out when a car turns round a corner without a bank angle is also carried out when a car turns round a corner with a bank angle, erroneous report occurs occasionally. When the bank angle is small, difference between a judgment at this case and a judgment value "0" at normal inner pressure is small even if the correction is inappropriate; therefore erroneous report is not made, but there has been a problem that when the bank angle is certain angle or more, the judgment value exceeds an alarming threshold to make erroneous report.

SUMMARY OF THE INVENTION

An object of the present invention is to provide a method, apparatus and program for alarming decrease in tire air-pressure capable of precisely detecting decrease in tire air-pressure even during turning round a corner with a large bank angle.

The present invention relates to a method for alarming decrease in tire air-pressure that detects decrease in tire air-pressure using a judgment value obtained based on rotational wheel speeds obtained from tires loaded on a vehicle, comprising a step of detecting the rotational wheel speeds of respective tires when a vehicle turns round a corner, a step of calculating a vehicle speed from the rotational wheel speeds of respective tires, a step of detecting the yaw rate of the vehicle, a step of detecting acceleration to a lateral direction by a lateral directional acceleration sensor, a step of estimating a bank angle at a corner during turning using the yaw rate, vehicle speed and lateral directional acceleration of the vehicle, a step of calculating a judgment value from the rotational wheel speeds of respective tires and a step of preventing erroneous judgment occurring during turning round a corner with a bank angle, based on the estimated bank angle.

Further, the present invention relates to an apparatus for alarming decrease in tire air-pressure that detects decrease in tire air-pressure using a judgment value obtained based on rotational wheel speeds obtained from tires loaded on a vehicle, comprising a means of detecting the rotational wheel speeds of respective tires when a vehicle turns round a corner, a means of calculating a vehicle speed from the rotational wheel speeds of respective tires, a means of detecting the yaw rate of the vehicle, a means of detecting acceleration to a lateral direction by a lateral directional acceleration sensor, a means of estimating a bank angle at a corner during turning using the yaw rate, vehicle speed and lateral directional acceleration of the vehicle, a means of calculating a judgment value from the rotational wheel speeds of respective tires and a means of preventing erroneous judgment occurring during turning round a corner with a bank angle, based on the estimated bank angle.

Further, the present invention relates to a program for alarming decrease in tire air-pressure that detects decrease in tire air-pressure using a judgment value obtained based on rotational wheel speeds obtained from tires loaded on a vehicle, making a computer execute a procedure of detecting the rotational wheel speeds of respective tires when a vehicle turns round a corner, a procedure of calculating a vehicle speed from the rotational wheel speeds of respective tires, a procedure of detecting the yaw rate of the vehicle, a procedure of detecting acceleration to a lateral direction by a lateral directional acceleration sensor, a procedure of estimating a bank angle at a corner during turning using the yaw rate, vehicle speed and lateral directional acceleration of the vehicle, a procedure of calculating a judgment value from the rotational wheel speeds of respective tires and a procedure of preventing erroneous judgment occurring during turning round a corner with a bank angle based on the estimated bank angle.

According to the present invention, it is possible to provide a method, apparatus and program for alarming decrease in tire air-pressure capable of precisely detecting decrease in tire air-pressure even during turning round a corner with a large bank angle by estimating a bank angle at a corner during turning using the yaw rate, vehicle speed and lateral directional acceleration of the vehicle and deciding whether a judgment value is corrected or not, based on the estimated bank angle.

DETAILED DESCRIPTION

Figure 1:
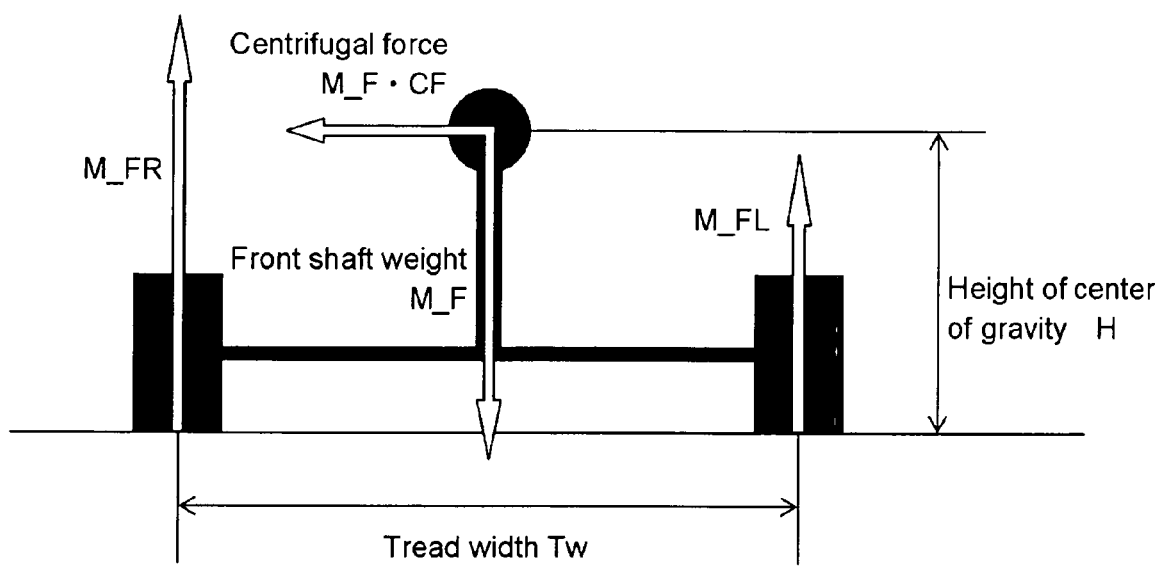
FIG. 1 is an illustration diagram representing force applied to the front shaft of a vehicle during turning round a corner without a bank angle.
Figure 2:
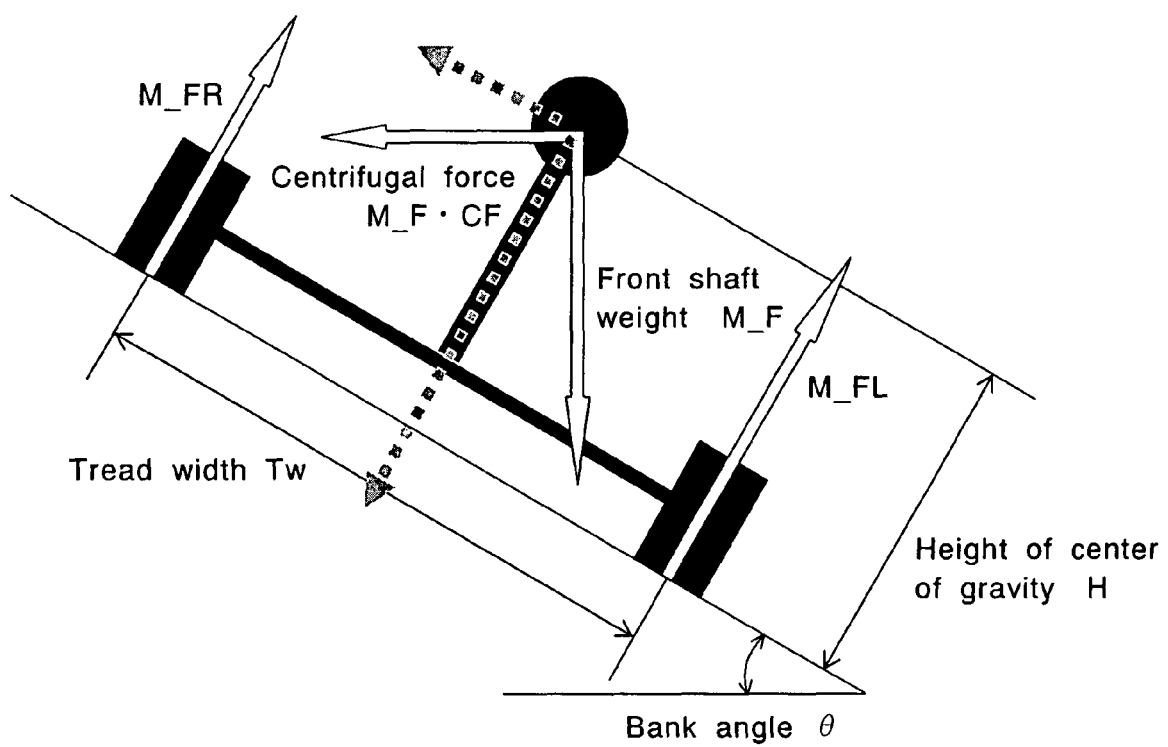
FIG. 2 is an illustration diagram representing force applied to the front shaft of a vehicle during turning round a corner with a bank angle.

A force applied to the front shaft of a vehicle during turning round a corner without a bank angle and during turning round a corner with a bank angle are illustrated referring to FIG. 1 and FIG. 2.

When a vehicle turns round a corner without a bank angle, the force shown in FIG. 1 is applied to the front wheels of the vehicle. Hereat, $M\_F$ represents the weight of a front shaft, $M\_F \times CF$ represents centrifugal force (CF is lateral directional acceleration applied to a vehicle when a bank angle is zero), Tw represents a width between treads of a front left wheel and a front right wheel, H represents the height of the center of gravity of a front shaft, $M\_FL$ represents force to a perpendicular direction applying to a front left wheel and $M\_FR$ represents force to a perpendicular direction applying to a front right wheel.

For these forces considering the balance of rotational moment in which a portion at which the front left wheel is grounded is the center of gravity and the balance of rotational moment in which a portion at which the front right wheel is grounded is the center of gravity, the equation (2) and (3) come into existence.

$$M\_FR = 0.5 M\_F + (M\_F \times CF \times H)/Tw \quad (2)$$

$$M\_FL = 0.5 M\_F - (M\_F \times CF \times H)/Tw \quad (3)$$

It is understood by the equation (2) and (3) that $M\_FL$ and $M\_FR$ differ as they depend on centrifugal force. Similarly, loads to a perpendicular direction applying to left wheel differ from that of right wheel. Accordingly, the difference of wheel rotational number occurs depending on outside and inside during turning round a corner and additionally, loads applied to a perpendicular direction of respective wheels differ. Further, since slip ratio for a drive shaft differ from that of a driven shaft in case of a general 2 wheels drive vehicle, the rotational wheel speed of each of 4 wheels differs as a result and even if all 4 wheels are normal inner pressure, the deflation judgment value, DEL is not zero of a normal inner pressure state at straight running.

The correction of the deflation judgment value, DEL during turning round a corner is carried out during turning round a corner at a bank angle of zero that can be assumed most in a general public road, as an objective. A judgment value, DEL' corrected with the equation (4) is used, using correction coefficients COR1 and COR2 and lateral directional acceleration CF.

$$DEL' = DEL - COR1 \times CF - COR2 \times DFR \times CF \quad (4)$$

In the equation (4), CF represents force laterally applied to a vehicle, it corresponds to the lateral directional acceleration in case of turning round a corner without a bank angle, the DFR differs depending on the kind of a vehicle, it is represented by the equation (5) in case of a front wheel drive vehicle (FF car) and it is represented by the equation (6) in case of a rear wheel drive vehicle (FR car).

$$DFR = (V1 + V2)/(V3 + V4) - 1 \quad (5)$$

$$DFR = (V3 + V4)/(V1 + V2) - 1 \quad (6)$$

When the DFR is not greatly changed (nearby zero), the judgment value, DEL can be corrected by the equation (7) using a correction coefficient COR3.

$$DEL' = DEL - COR3 \times CF \quad (7)$$

In the equation (4) and (7), COR 1, COR 2 and COR 3 differ by every vehicle, and the deflation judgment value, DEL at all wheel tires with normal inner pressure can be corrected to zero in case of turning round a corner without a bank angle, by correcting the deflation judgment value, DEL by the equation (4) or (7).

On the other hand, force applied to front wheels in case of turning round a corner with a bank angle is shown in FIG. 2. Hereat, θ is a bank angle.

In like manner as a case of the bank angle of zero, considering the balance of rotational moment in which a portion at which the front left wheel is grounded is the center of gravity and the balance of rotational moment in which a portion at which the front right wheel is grounded is the center of gravity, the equation (8) and (9) come into existence.

$$M\_FR = 0.5 M\_F \times (CF \times \sin\theta + \cos\theta) + M\_F \times (CF \times \cos\theta - \sin\theta) \times H/Tw \quad (8)$$

$$M\_FL = 0.5 M\_F \times (CF \times \sin\theta + \cos\theta) - M\_F \times (CF \times \cos\theta - \sin\theta) \times H/Tw \quad (9)$$

Namely, the rotational wheel speeds in case of turning round a corner with a bank angle differ from those in case of turning round a corner without a bank angle because load distributions applied on respective tires in case of turning round a corner with a bank angle differ from those in case of turning round a corner without a bank angle. Consequently, when the above-mentioned correction being the most appropriate for a case of turning round a corner without a bank angle is used, it is occasionally inappropriate correction for a case of turning round a corner with a bank angle.

One embodiment of the present invention for solving these problems is illustrated below based on the attached drawings.

Figure 3:
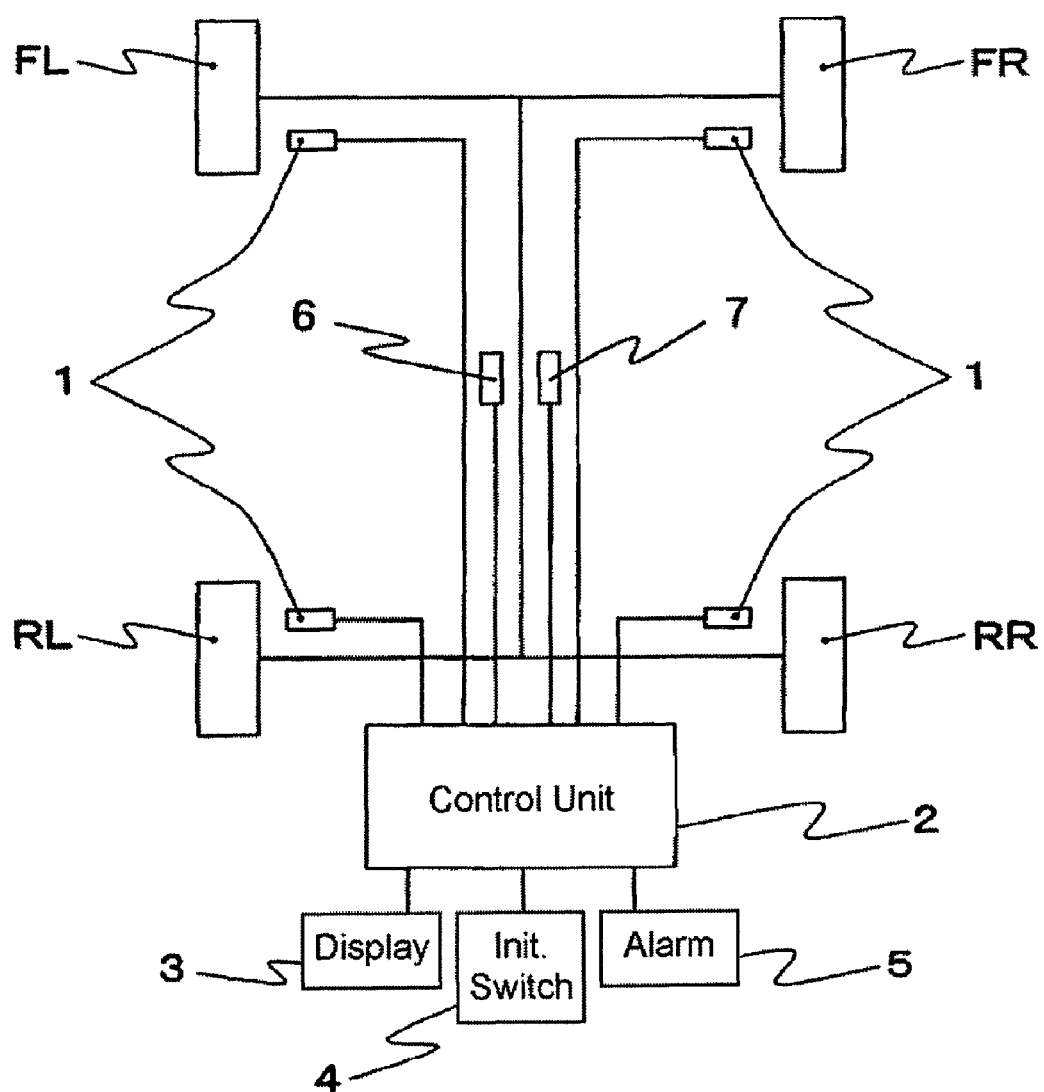
FIG. 3 is a block diagram showing one Embodiment of an apparatus for alarming decrease in tire air-pressure according to the present invention.

As shown in FIG. 3, the apparatus for alarming decrease in tire air-pressure related to the embodiment of the present invention detects whether each air-pressure of 4 tires of FL, FR, RL and RR is decreased or not and is equipped with an usual the rotational wheel speed detecting means 1 provided relative to respective tires.

As the rotational wheel speed detecting means 1, there can be used a wheel speed sensor for generating rotational pulse using an electromagnetic pick-up or similar and measuring rotational angular velocities and wheel speeds based on the number of pulse, or an angular velocity sensor in which power is generated by using rotation such as in a dynamo, wherein rotational angular velocities and wheel speed are measured from a voltage. The output of the above-mentioned rotational wheel speed detecting means 1 is provided for a control unit 2 that is a computer for ABS. The control unit 2 is connected to a display unit 3 composed of a liquid crystal display device, a plasma display device or a CRT for informing whose tire air-pressure is decreased, an initialization switch 4 capable of being operated by a driver and alarm 5. Further, a vehicle is equipped with a yaw rate sensor 6 output signals corresponding to the yaw rate of the vehicle and a lateral directional acceleration sensor 7 output signals corresponding to lateral directional acceleration of the vehicle. The outputs of the yaw rate sensor 6 and the lateral directional acceleration sensor 7 are provided for the control unit 2.

Figure 4:
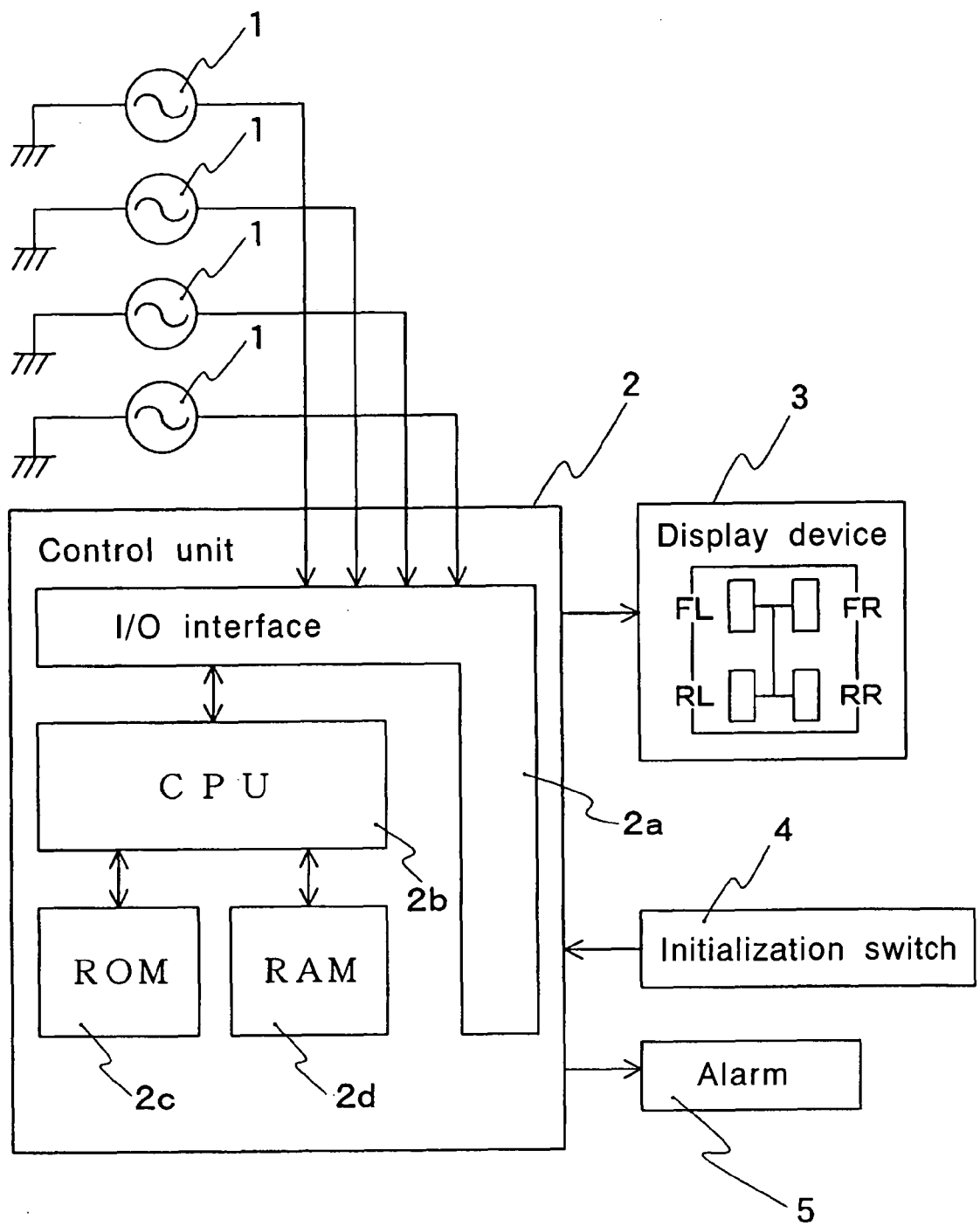
FIG. 4 is a block diagram showing an electrical configuration of an apparatus for alarming decrease in tire air-pressure illustrated in FIG. 3.

As shown in FIG. 4, the control unit 2 is composed of an I/O interface 2a necessary for transmission and receipt of signals with an external apparatus, CPU 2b functioning as the center of processing, ROM 2c in which the control operation program of the CPU 2b is stored and RAM 2d in which data are temporarily written when the CPU 2b carries out control operation and data written are read, etc.

Pulse signals (hereinafter, called as wheel speed pulse) corresponding to the rotational numbers of tires are outputted at the rotational wheel speed detecting means 1. Further, at the CPU 2b, the rotational angular velocities Fi of respective tires are calculated by every fixed sampling period $\Delta T$ (sec), for example, $\Delta T = 1$ sec based on the wheel speed pulse outputted from the rotational wheel speed detecting means 1.

By the way, since tires are produced including variation (initial difference) within standard, the effective rolling radii (a value obtained by dividing distance advancing at one rotation by $2\pi$) of respective tires are not always the same even if all tires are normal air-pressure. Consequently, the rotational angular velocities Fi of respective tires are fluctuated. Accordingly, there is a method of excluding the influence of initial difference from the rotational angular velocities Fi. In the method, firstly, initial correction coefficients K1, K2 and K3 are calculated by the equation (10) to (12).

$$K1 = F1/F2 \quad (10)$$

$$K2 = F3/F4 \quad (11)$$

$$K3 = (F1 + K1 \times F2)/(F2 + K2 \times F4) \quad (12)$$

Then, as shown in the equation (13) to (16), new rotational angular velocities $F1i$ of respective tires are determined using the initial correction coefficients K1, K2 and K3.

$$F1_1 = F1 \quad (13)$$

$$F1_2 = K1 \times F2 \quad (14)$$

$$F1_3 = K3 \times F3 \quad (15)$$

$$F1_4 = K2 \times K_3 \times F4 \quad (16)$$

Hereat, the initial correction coefficient K1 is a coefficient for correcting the difference of the effective rolling radii by initial difference between the front left tire and the front right tire. The initial correction coefficient K2 is a coefficient for correcting the difference of the effective rolling radii by initial difference between the rear left tire and the rear right tire. The initial correction coefficient K3 is a coefficient for correcting the difference of the effective rolling radii by initial difference between the front left tire and the rear left tire. Further, the rotational wheel speeds Vi of respective tires can be calculated based on the fore-mentioned $F1_i$.

In the present invention, the vehicle speed is calculated using the equation (17) using the rotational wheel speeds Vi of respective tires calculated.

$$V = (V1 + V2 + V3 + V4)/4 \quad (17)$$

In the present invention, it is judged during turning round a corner whether there is a bank angle or not, using the vehicle speed calculated by the equation (17), the yaw rate detected by a yaw rate sensor and the lateral directional acceleration detected by the lateral directional acceleration sensor. Specifically, it is judged whether there is a bank angle or not by estimating the bank angle.

The yaw rate $\omega$[rad/sec] is obtained by the yaw rate sensor. The lateral directional acceleration Lat G [G] for a vehicle is calculated by the equation (18) using the vehicle speed and the yaw rate $\omega$.

$$LatG = V \times \omega / G \quad (18)$$

In the equation (18), G is a number converting the unit of $[m/s^2]$ to the unit of gravity acceleration and represents $9.80665 \, [m/s^2]$. Further, the Lat G represents the lateral directional acceleration without a bank angle.

On the other hand, the lateral directional acceleration Lat G' [G] obtained by the lateral directional acceleration sensor is acceleration in a lateral direction for a vehicle, namely in a direction parallel to road surface. Since this is the lateral directional acceleration obtained by "M_F×CF×cos $\theta$ – M_F× sin $\theta$" that is one of force component of FIG. 2, Lat G' satisfies the equation (19).

$$\begin{aligned} Lat \, G' &= (M\_F \times CF \times \cos\theta - M\_F \times \sin\theta)/M\_F \\ &= CF \times \cos\theta - \sin\theta \end{aligned} \quad (19)$$

Hereat, since CF×cos $\theta$ corresponds to Lat G, the lateral directional acceleration Lat G obtained by the vehicle speed and the yaw rate $\omega$ and the lateral directional acceleration Lat G' obtained by the lateral directional acceleration sensor satisfy the equation (20).

$$LatG' = LatG - \sin\theta \quad (20)$$

From the above, the bank angle can be estimated by difference between the lateral directional acceleration Lat G obtained by the vehicle velocity and the yaw rate $\omega$ and the lateral directional acceleration Lat G' obtained by the lateral directional acceleration sensor. Namely, the sine value sin $\theta$ of the bank angle $\theta$ satisfies the equation (21).

$$\sin\theta = Lat\,G - Lat\,G' \quad (21)$$

When the bank angle was large, an erroneous report has been conventionally made occasionally. Consequently, in the present invention, when the sin $\theta$ value sine of the bank angle calculated exceeds a preliminarily set threshold B for preventing an erroneous report, the deflation judgment is not made. Further, when it does not exceed the preliminarily set threshold B for preventing an erroneous report, the judgment value DEL' corrected with the equation (4) or (7) is used in like manner as conventionally, and when it exceeds the threshold A for judging decrease in tire air-pressure, it is judged that the tire air-pressure is decreased.

Thus, when the bank angle is large, the deflation judgment is not made because there were many erroneous reports and when it is small, the deflation judgment is made; therefore decrease in tire air-pressure can be precisely judged also during turning round a corner with a bank angle.

The means (1) to (5) of operation of apparatus for alarming decrease in tire air-pressure related to one embodiment of the present invention are illustrated below based on the flow chart of FIG. 5.

(1) Firstly, the vehicle speed V is calculated by the equation (17) using the detected rotational wheel speeds Vi of respective tires. Further, the yaw rate ω is detected from the yaw rate sensor and the lateral directional acceleration Lat G' is detected from the lateral directional acceleration sensor (Step S1).

(2) Then, the lateral directional acceleration Lat G is calculated by the equation (18) using the vehicle speed and the yaw rate ω. The sine value sin θ of the bank angle θ is calculated by the equation (21) using Lat G' and Lat G. Hereat, the threshold B for preventing an erroneous report is set (Step S2). The threshold B set for preventing an erroneous report is, for example, 0.122 but is not specifically limited to this and preferably changed depending on running condition, the kind of a vehicle and the size of tires.

(3) Then, the sine value sin θ of the bank angle θ is compared with the threshold B for preventing an erroneous report. As a result, when the sine value sin θ of the bank angle θ is larger than the threshold B, the judgment of the decrease in tire air-pressure is completed. Further, when the sine value sin θ of the bank angle θ is smaller than the threshold B, transfer to Step S4 (Step S3).

(4) The deflation judgment value DEL is corrected using the equation (22).

$$DEL' = DEL - COR3 \times LatG \qquad (22)$$

Then, the threshold A for judging decrease in tire air-pressure and the correction coefficient COR3 used in the equation (22) are set (Step S4). The threshold A for judging decrease in tire air-pressure and the correction coefficient COR3 used in the equation (22) are, for example, 0.10 and 0.20591 but are not specifically limited to this and preferably changed depending on running condition, the kind of a vehicle and the size of tires.

(5) Further, the deflation judgment value DEL' after correction is compared with the threshold A for judging decrease in tire air-pressure. As a result, when the deflation judgment value DEL' after correction is smaller than the threshold A, the judgment of decrease in tire air-pressure is completed. Further, when the deflation judgment value DEL' after correction is larger than the threshold A, it is judged that the tire air-pressure is decreased and alarm is generated (Step S5).

Further, the apparatus for alarming decrease in tire air-pressure of the present invention was illustrated hitherto, but the method for alarming decrease in tire air-pressure and the program thereof are also similar.

EXAMPLE

The present invention is specifically illustrated based on Examples, but the present invention is not limited only to these.

Example 1 and Comparative Example 1

4 Wheel tires with a tire size of 205/60R14 were loaded on a rear wheel drive vehicle for test, 2 persons got on the vehicle and the vehicle run at a constant speed of 50 km/h at a corner with a turning radius of 150 m and 3 corners with bank angles of 0°, 6° and 12°.

Figure 5:
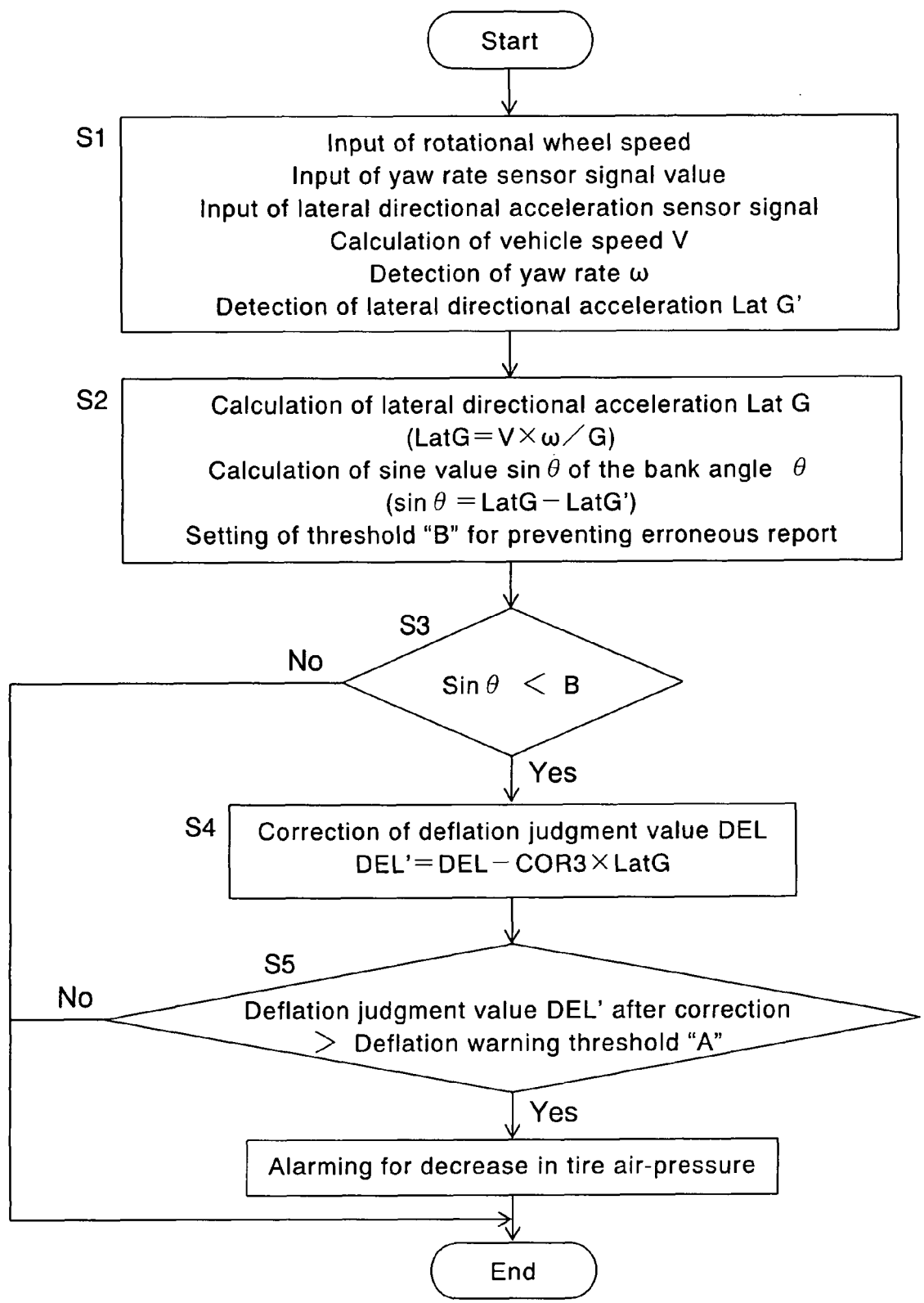
FIG. 5 is a flowchart related to the respective procedures of the program for alarming decrease in tire air-pressure of the present invention.

The flow chart of the apparatus for alarming decrease in tire air-pressure mounted on the vehicle of Example 1 is shown in FIG. 5.

Firstly, the vehicle speed V was calculated from the rotational wheel speed, a yaw rate ω was detected from a yaw rate sensor and lateral directional acceleration Lat G' was detected from a lateral directional acceleration sensor (Step S1).

Then, the lateral directional acceleration Lat G was calculated by the equation (18) using the vehicle speed V and the yaw rate (and the sine value sin θ of a bank angle θ was calculated by the equation (21). At that time, a threshold B for preventing an erroneous report was set at 0.122 (Step S2).

Then, the sine value sin θ of the bank angle θ was compared with the threshold B for preventing an erroneous report (Step S3), and when the sine value sin θ of the bank angle θ was larger than the threshold B, the judgment of decrease in tire air-pressure was completed. Further, when the sine value sin θ of the bank angle θ was smaller than the threshold B, the deflation judgment value DEL was corrected using the equation (22) (Step S4).

Hereat, the threshold A for judging decrease in tire air-pressure was set at 0.10 and the correction coefficient COR3 used in the equation (22) was set at −0.20591.

The deflation judgment value DEL' after correction obtained by the equation (22) was compared with the threshold A for judging decrease in tire air-pressure and when the deflation judgment value DEL' after correction was smaller than the threshold A, the judgment of decrease in tire air-pressure was completed. Further, when the deflation judgment value DEL' after correction was larger than the threshold A, it was judged that tire air-pressure was decreased and alarm was generated (Step S5).

Figure 6:
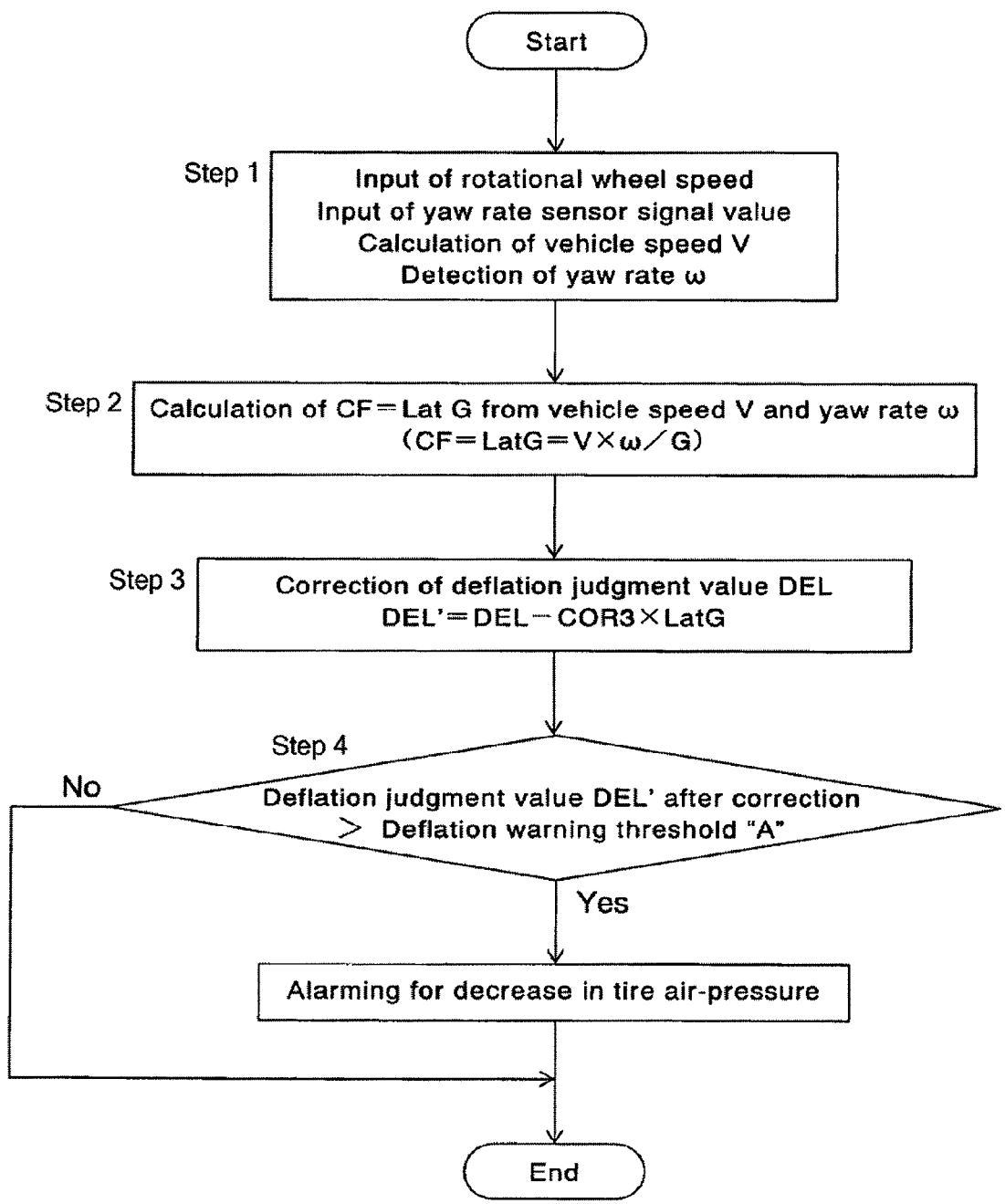
FIG. 6 is a flow chart related to the respective procedures of a program for alarming decrease in tire air-pressure referring to a prior art.

Then, the flow chart of an apparatus for alarming decrease in tire air-pressure mounted on the vehicle of Comparative Example 1 is shown in FIG. 6.

Firstly, the vehicle speed V was calculated from the rotational wheel speed and a yaw rate ω was detected from a yaw rate sensor (Step 1).

Then, the lateral directional acceleration Lat G was calculated by the equation (18) using the vehicle speed V and the yaw rate .omega. (Step 2).

Then, the deflation judgment value DEL was corrected using the equation (22) (Step 3).

Hereat, the threshold A for judging decrease in tire air-pressure was set at 0.10 and the correction coefficient COR3 used in the equation (22) was set at −0.20591.

The corrected deflation judgment value DEL' obtained by the equation (22) was compared with the threshold A for judging decrease in tire air-pressure and when the corrected deflation judgment value DEL' was smaller than the threshold A, the judgment of decrease in tire air-pressure was completed. Further, when the corrected deflation judgment value DEL' was larger than the threshold A, it was judged that tire air-pressure was decreased and alarm was generated (Step 4).

The test results of Example 1 and Comparative Example 1 are shown in Table 1.

TABLE 1

| | Bank angle θ [°] | | |
|---|---|---|---|
| | 0 | 6 | 12 |
| Deflation judgment value DEL' after correction | 0.00 | 0.04 | 0.11 |
| Sine value sinθ calculated | 0.000 | 0.104 | 0.208 |
| Deflation judgment result of Comparative Example 1 | No alarm | No alarm | Alarm was generated (erroneous report) |
| Deflation judgment result of Example 1 | No alarm | No alarm | No alarm |

When the bank angle is 12°, that is to say, the bank angle is large, the deflation judgment value DEL' after correction was 0.11 and exceeded 0.10 of the threshold for judging decrease in tire air-pressure.

Accordingly, nevertheless all of 4 wheels were normal inner pressure in Comparative Example 1 not equipped with means for preventing an erroneous report, alarm was generated.

On the other hand, when the bank angle was 12° in Example 1 equipped with means for preventing an erroneous report, the judgment of decrease in tire air-pressure was not made; therefore erroneous report could be prevented.

What is claimed is:

1. A method for alarming decrease in tire air-pressure that detects decrease in tire air-pressure using a judgment value obtained based on rotational wheel speeds obtained from tires loaded on a vehicle, the method comprising the following steps carried out using a computer:
    detecting the rotational wheel speeds of respective tires when the vehicle turns round a corner,
    calculating a vehicle speed from the rotational wheel speeds of respective tires,
    detecting a yaw rate of the vehicle,
    detecting acceleration to a lateral direction by a lateral directional acceleration sensor,
    estimating a bank angle at the corner during turning using the yaw rate, the vehicle speed and the lateral directional acceleration of the vehicle,
    calculating the judgment value from the rotational wheel speeds of respective tires,
    preventing erroneous judgment occurring during turning round the corner with the bank angle by setting a threshold based on the estimated bank angle, and
    generating an alarm when the judgment value exceeds the threshold.

2. An apparatus for alarming decrease in tire air-pressure that detects in tire air-pressure using a judgment value obtained based on rotational wheel speeds obtained from tires loaded on a vehicle, comprising
    a means of detecting the rotational wheel speeds of respective tires when the vehicle turns round a corner,
    a means of calculating a vehicle speed from the rotational wheel speeds of respective tires,
    a means of detecting a yaw rate of the vehicle,
    a means of detecting acceleration to a lateral direction by a lateral directional acceleration sensor,
    a means of estimating a bank angle at the corner during turning using the yaw rate, the vehicle speed and the lateral directional acceleration of the vehicle,
    a means of calculating the judgment value from the rotational wheel speeds of respective tires,
    a means of preventing erroneous judgment occurring during turning round the corner with the bank angle by setting a threshold based on the estimated bank angle, and
    a means of generating an alarm when the judgment value exceeds the threshold.

3. A program carried on computer-readable media for alarming decrease in tire air-pressure based on detected decrease in tire air-pressure using a judgment value based on rotational wheel speeds of wheels on a vehicle, the program, when executed, causing a computer to execute the following procedures:
    detecting the rotational wheel speeds of respective tires when the vehicle turns round a corner,
    calculating a vehicle speed from the rotational wheel speeds of respective tires,
    detecting a yaw rate of the vehicle,
    detecting acceleration to a lateral direction by a lateral directional acceleration sensor,
    estimating a bank angle at the corner during turning using the yaw rate, the vehicle speed and the lateral directional acceleration of the vehicle,
    calculating the judgment value from the rotational wheel speeds of respective tires,
    preventing erroneous judgment occurring during turning round the corner with the bank angle by setting a threshold based on the estimated bank angle, and
    generating an alarm when the judgment value exceeds the threshold.

* * * * *